United States Patent
Krishna et al.

(10) Patent No.: US 9,889,793 B2
(45) Date of Patent: Feb. 13, 2018

(54) GLOW RING FOR INSTRUMENT PANEL

(71) Applicant: N.S. International, LTD, Troy, MI (US)

(72) Inventors: Arul Krishna, Farmington Hills, MI (US); Sibing Xu, Oak Park, MI (US); Anirudh N. Hegde, Sterling Heights, MI (US)

(73) Assignee: N.S. International, LTD, Troy, MI (US)

( * ) Notice: Subject to any disclaimer, the term of this patent is extended or adjusted under 35 U.S.C. 154(b) by 60 days.

(21) Appl. No.: 14/990,263

(22) Filed: Jan. 7, 2016

(65) Prior Publication Data

US 2016/0200247 A1 Jul. 14, 2016

Related U.S. Application Data

(60) Provisional application No. 62/102,288, filed on Jan. 12, 2015.

(51) Int. Cl.
*B60Q 3/14* (2017.01)
*B60Q 3/04* (2006.01)
(Continued)

(52) U.S. Cl.
CPC ............ *B60Q 3/044* (2013.01); *B60Q 3/005* (2013.01); *G01D 11/28* (2013.01)

(58) Field of Classification Search
CPC . G01D 11/28; B60Q 3/20; B60Q 3/14; B60Q 3/10
(Continued)

(56) References Cited

U.S. PATENT DOCUMENTS

| | | | | |
|---|---|---|---|---|
| 4,729,185 A | * | 3/1988 | Baba | G02B 6/0021 362/615 |
| 5,047,761 A | * | 9/1991 | Sell | G01D 11/28 116/288 |

(Continued)

FOREIGN PATENT DOCUMENTS

| FR | 2957724 A1 | 9/2011 |
|---|---|---|
| GB | 2435937 A | 9/2007 |
| WO | WO-2014155350 A1 | 10/2014 |

OTHER PUBLICATIONS

European Patent Office Search Report dated May 12, 2016; 8 pages.

*Primary Examiner* — Julie Bannan
(74) *Attorney, Agent, or Firm* — Butzel Long (57) ABSTRACT

In one aspect, the disclosure relates to a light emitting assembly for an instrument panel, which includes a light guide assembly a light guide assembly body and at least one light transmissive leg extending from the light guide assembly body. The leg has a light input surface along an edge in close proximity to a light emitting diode. The leg may be integral with the body at an intersection that forms a prismatic Y shaped light reflective structure at the body. The prismatic Y shaped light reflective structure forms an angle of reflection surface at the intersection with the body of a predetermined angle of reflection to reflect light from the leg to the light guide assembly body. The reflected light ray is refracted substantially uniformly through the light guide assembly body to produce substantially uniform illumination of the light guide assembly.

13 Claims, 6 Drawing Sheets

(51) Int. Cl.
*G01D 11/28* (2006.01)
*B60Q 3/00* (2017.01)

(58) Field of Classification Search
USPC .......................... 362/489, 482, 23.16, 26.09
See application file for complete search history.

(56) References Cited

U.S. PATENT DOCUMENTS

| | | | | |
|---|---|---|---|---|
| 5,084,698 A * | 1/1992 | Sell | ................ | G01D 11/28 116/288 |
| 6,276,809 B1 * | 8/2001 | Matsumoto | ............ | G01D 11/28 362/23.15 |
| 6,356,394 B1 * | 3/2002 | Glienicke | ................ | B60Q 3/14 359/641 |
| 6,474,859 B2 * | 11/2002 | Lepley | ................ | G02B 6/0001 362/23.01 |
| 6,871,988 B2 * | 3/2005 | Gebauer | ............... | B60Q 1/0052 362/307 |
| 6,880,945 B2 * | 4/2005 | Knaack | ................ | B60Q 1/0052 362/507 |
| 8,454,180 B2 * | 6/2013 | Kenmotsu | .............. | G01D 11/28 362/23.18 |
| 8,523,407 B2 * | 9/2013 | Huang | ...................... | F21K 9/61 362/327 |
| 2003/0128957 A1 * | 7/2003 | Kalantar | ................ | B60K 35/00 385/146 |
| 2006/0291183 A1 * | 12/2006 | Nishiyama | ............. | G05G 1/105 362/23.15 |
| 2008/0285256 A1 * | 11/2008 | Mezouari | ............ | G01D 11/28 362/23.13 |
| 2009/0316382 A1 | 12/2009 | Birman et al. | | |
| 2011/0286240 A1 * | 11/2011 | Wang | ................... | G02B 6/0018 362/607 |
| 2012/0099310 A1 * | 4/2012 | Kropac | ................. | B60Q 3/004 362/235 |

* cited by examiner

FIG. 9 and the appended claims.
GLOW RING FOR INSTRUMENT PANEL

CROSS-REFERENCE TO RELATED APPLICATION

This application claims priority to U.S. provisional patent application No. 62/102,288 filed on Jan. 12, 2015, which is hereby incorporated by reference in its entirety.

TECHNICAL FIELD

Light emitting assemblies for automotive and other applications are generally well known. Regardless there is a continuous need for improvement in the uniformity of light transmission through such assemblies for aesthetic, safety and efficiency reasons. Specifically, there has been a continuing trade-off between the uniformity of light transmission through such assemblies and the number and location of the necessary light emitting diodes (LEDs) to illuminate such assemblies. These trade-offs have resulted in instrument panels that use multiple LEDs, and have "bright spots" in the illumination medium where too much illumination is emitted, and dark or dull spots, where not enough illumination is emitted. In addition, there has been a problem with light being mischanneled through locator tabs or other structures where the light is lost, thereby lowering the intensity of the light that is emitted from light emitting assemblies. This may affect the aesthetics of the instrument panel and, in extreme cases, may affect safety issues related to the instrument panel, such as, for example, a vehicle instrument panel.

In accordance with one aspect, there is disclosed a light emitting assembly for instrument panel illumination, such as, for example, a vehicle instrument panel. The assembly may include a light guide assembly having opposed first and second surfaces separated by a sidewall extending substantially unbroken therebetween to define a light guide assembly body having a width and a light guide body index of refraction. The light guide assembly is made from any suitable transparent, moldable, elastomeric material having a predetermined index of refraction.

At least one light transmissive leg extends from the second surface of the light guide assembly body. Each light transmissive leg has a first end and a second end separated by a length to define a leg body, and the first end has a light input surface along an edge of the leg. The light input surface is in close proximity to at least one of the diodes, and the light emitting diode emit an incident light ray at an angle of incidence to said light input surface.

The leg has in index of refraction for refracting the incident light ray to form a refractive light ray along the light transmissive leg. Integral with the light guide assembly body and formed integrally at an intersection of the second end of the leg, is a prismatic Y shaped light reflective structure at the first surface of the light guide body.

The prismatic Y shaped light reflective structure forms an angle of reflection surface at said intersection with said first surface within the width of the body of a predetermined angle of reflection to reflect the refractive light ray from the leg to the second surface of the light guide assembly body. The reflected light ray is then refracted substantially uniformly through said light guide assembly body along the first and second body surfaces to produce substantially uniform illumination of said light guide assembly.

The light emitting assembly need not be limited to use in instrument panels. There is also a need for any number of lighting applications, especially in automotive applications. Examples include, but are not limited to, vanity mirrors, interior lighting, lighting controls, switches, door lights, reading lights, accent lights, steering wheels, radios/infotainment system lighting, etc.

These and other aspects of the disclosure will become apparent when referring to the following drawings, description of the drawings and the appended claims.

DETAILED DESCRIPTION

Figure 1:
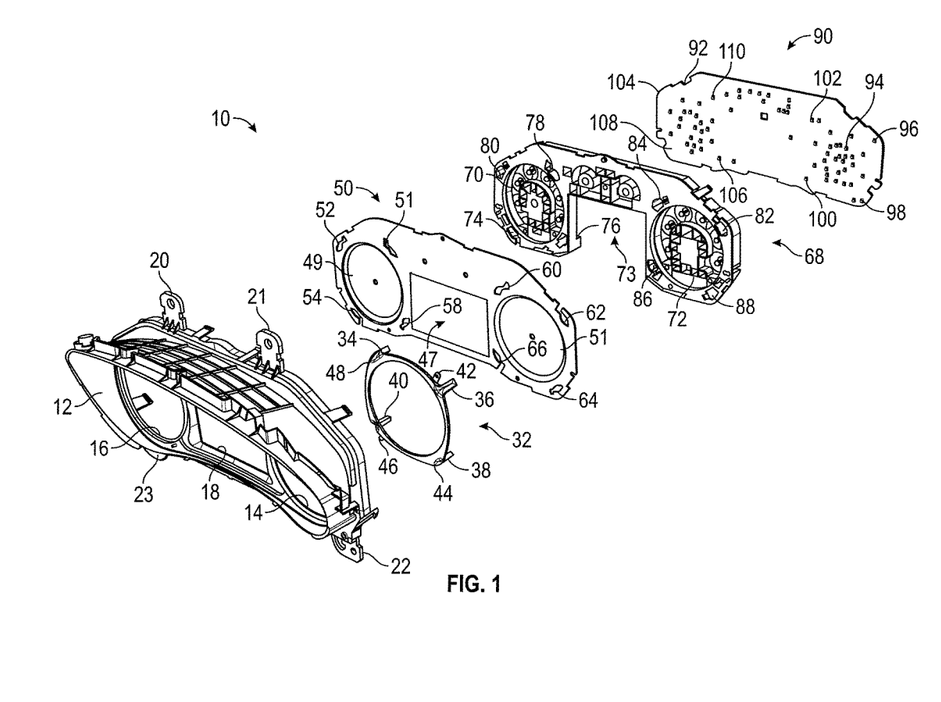
FIG. 1 is an exploded schematic view of a vehicle instrument panel showing its construction according to one aspect of the disclosure.
Figure 2:
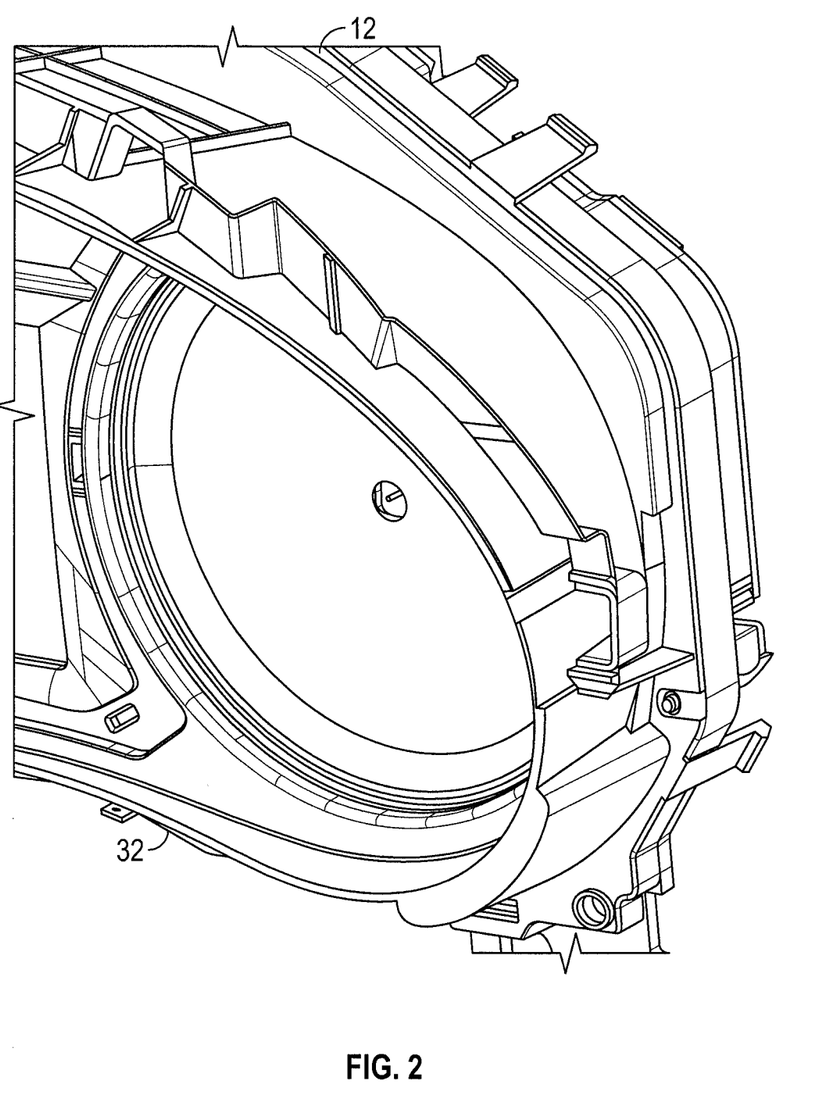
FIG. 2 is a detailed schematic view showing the vehicle instrument panel of FIG. 1 in assembled mode, with the light emitting assembly in place.

Turning now to the drawings wherein like numbers refer to like structures, and particularly to FIGS. 1 and 2, there is disclosed therein a basic geometry on one aspect of a light guide useful in one embodiment of a light emitting assembly.

Specifically, FIG. 1 is an exploded schematic view of an instrument panel 10, such as an instrument panel, according to one aspect of the present disclosure. The instrument panel has a visor 12 equipped with instrument apertures 14, 16 and 18, to accommodate various instrument gauges (such as speedometer, tachometer, etc) and other controls, systems or radio or infotainment systems and controls. The instrument visor is further equipped with aperture attachment flanges 20, 21, 22 and 23, to permit the assembled instrument panel to be secured into place in the vehicle interior. As is well known, the instrument panel may also include a transparent substrate overlying at least the visor body aperture for viewing said gauge. Suitable transparent substrates include plates, plastic, film or any other medium.

A light guide assembly 32, shown as a glow ring, has legs 34, 36, 38, and 40 as well as locator tabs 42, 44, 46 and 48. As will be discussed in greater detail regarding FIGS. 3 through 7, the light guide assembly may be any shape, but is here shown as a ring structure. The light guide assembly is a transparent, moldable, elastomeric material having a predetermined index of refraction that is suitable for a "one shot" molding process for convenience of manufacture.

An appliqué 50 has instrument detents 49 and 51, together with aperture 47 to accommodate instrument gauges and the radio or infotainment system of an exemplary vehicle instrument panel. The appliqué is equipped with apertures 52, 54, 56, 58, at detent 49 and apertures 60, 62, 64, and 66 at detent 51, shown as slotted arcuate apertures, to permit the legs of the glow ring to pass therethrough, and to interact with the locator tabs on the glow ring so that during assembly, the glow ring in fitted through the appliqué slots and turned to engage the locator tabs to secure the glow ring into place in the appliqué.

A light housing 68 has instrument recesses 70 and 72 as well as a cut out 73 to accommodate the radio/infotainment system. The light housing has glow ring apertures 74, 76, 78, and 80 at recess 70, and glow ring apertures 82, 84, 86, and 88 at recess 72. The legs of the glow ring extend through these apertures when the instrument panel is assembled, so that the glow ring legs may be in close proximity to light emitting diodes on printed circuit board 90.

Printed circuit board includes circuits 92 and 94 and is electrically connected to a vehicle electrical system for powering all the instrument gauges of the vehicle. The circuit board includes light emitting diodes (LEDs) 96, 98, 100, 102, 104, 106 108 and 110 as indicated for emitting light to the glow ring as will be hereafter be described. The LEDs are positioned on the circuit board in any configuration as to be complementarily accessible to the legs of the glow ring.

FIG. 2 is a detailed sectional view of an assembled vehicle instrument panel showing the glow ring (or light guide assembly) in place. The light guide assembly (glow ring) is located in close proximity to the gauge detent and the gauge aperture so that, when powered, will substantially uniformly illuminate the gauge with which it is associated.

Figure 3:
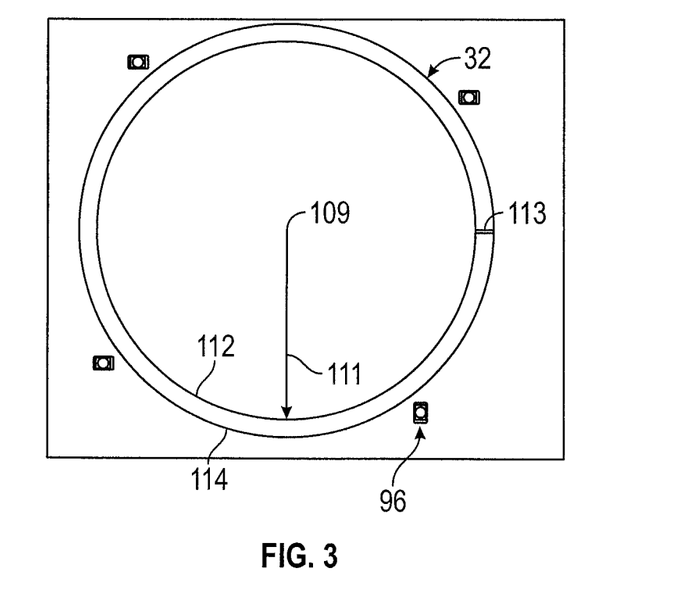
FIG. 3 is a schematic top plan view of one embodiment of the light emitting assembly showing a basic geometry of one application.

FIG. 3 is a schematic representation of one configuration of a light guide assembly 32 showing a top plan view. Specifically the light guide assembly in this embodiment is depicted as circular, and has a center 109, a diameter 111 to an inner periphery 112, all of which are subject to design choice and requirements of application. The light guide assembly has a ring width 113, and an outer periphery 114 and is situated in close proximity to LEDs on a circuit. Note that the legs of the light guide assembly are not depicted in this view so that the positioning of the light guide assembly relative to the LEDs can be clearly shown.

Figure 4:
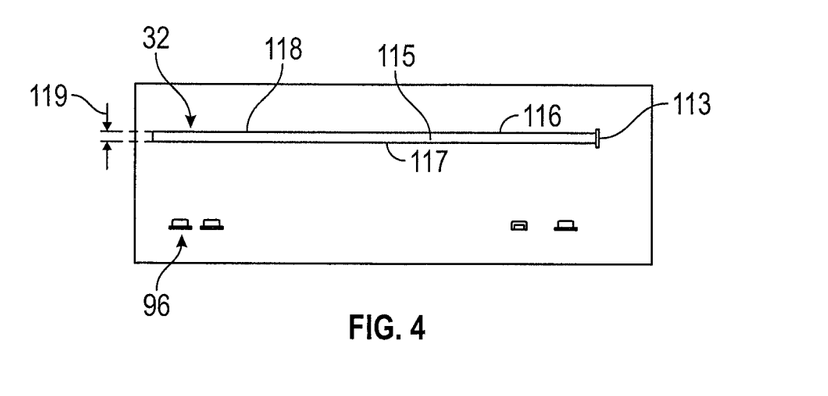
FIG. 4 is a schematic side view of the embodiment in FIG. 3 showing the side view of the assembly.

FIG. 4 is a schematic representation of the light guide assembly of FIG. 3, showing the sidewall 115 extending substantially unbroken between a first or top surface 116 and second or bottom surface 117 to define a body 118 with a thickness 119. Note that the light guide assembly thickness is about half the width 113. Again, the legs are not shown in this view simply to show the location of the light guide assembly in close proximity to the LEDs on the circuit.

Figure 5:
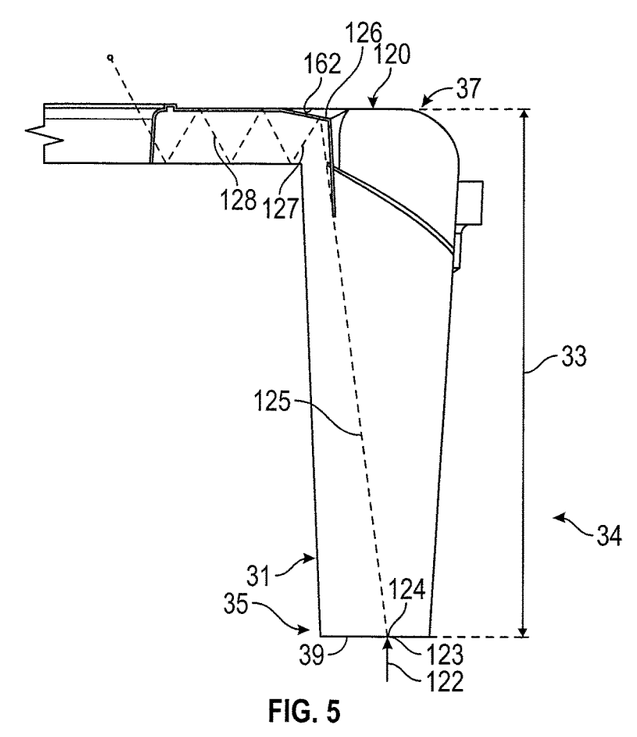
FIG. 5 is a detailed schematic side view of the light emitting assembly light guide depicting a leg and showing the incident light ray, the refracted light ray, and prismatic reflective structure reflecting the refracted light ray to the second surface for refraction along the first and second opposed surfaces.

FIG. 5 is a detailed side view of the light guide assembly 32 showing a leg 34. The geometry shown is optimized to reduce so called hot spots in the visible area of the glow ring by the angle of surface 162. Any leg of the glow ring may be understood to have similar characteristics and location relative to an LED as will described in relation to leg 34. Leg has a first end 35 and a second end 37 separated by a length 33. The leg has a surface 31, and a light input surface 39 in close proximity, or directly proximal, to a LED. The second end of the leg forms a prismatic Y shaped reflective structure 120 integral with the body of the light guide assembly at its first or top surface. The prismatic Y shaped light reflective structure is formed to create a reflective surface angle 162 at, along or within the first surface of the light guide assembly of from about 6 to about 10 degrees relative to horizontal.

The glow ring assembly body has an index of refraction as does the leg. These indices of refraction may be the same or different, depending upon design needs. The LED emits an incident light ray 122 which strikes the light input surface at an angle of incidence 123. The leg, which has a refractive index, refracts the incoming light at a refraction angle 124 as a refraction light ray 125. The refraction ray strikes the prismatic reflective surface 126 at an angle of incidence, and is reflected at an angle of reflection 127 to the second (or bottom) surface of the ring. The light ray is then refracted along path 128 through the body portion of the light guide assembly, being reflected between the first surface and the second surface of the light guide assembly body. As the light ray reflects at the edge or surface of the first or second surface, the body glows and the light is emitted substantially uniformly along the body of the light guide assembly. It is especially important to control the reflection and refraction of the light as it moves through the light guide assembly to minimize any "bright spots", especially at the first surface where the refractive light ray strikes the first surface of the light guide assembly body, and also to minimize any "dark spots" that may occur especially at the locator tabs where the light may be diffused and thereby lost for useful illumination purposes.

Figure 6:
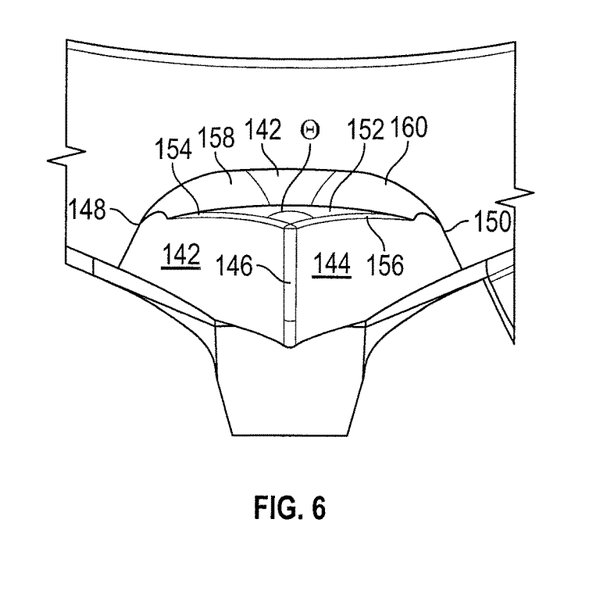
FIG. 6 is a detailed schematic top perspective view of the prismatic Y shaped reflective structure shown in FIG. 5.

Turning to FIG. 6, there is shown a detailed perspective top view of a portion of the first surface and leg intersection showing the basic Y shaped glow ring structure which diverts light into both right and left channels of the glow ring to avoid dark spots at locales distant from the light source. The prismatic Y shaped light reflective structure includes first and second concave arcuate surfaces 142, 144, respectively, opposed to each other by an angle θ and intersecting with each other at first end apex 146 and intersecting the light guide emitting assembly body at a second end 148 and 150, respectively. The prismatic Y shaped reflective structure has a top surface 152 intersecting the concave arcuate surfaces 142 and 144 by first and second upwardly inclined arcuate land surfaces 154 and 156, respectively. The top surface is concavely arcuate and intersects light guide emitting assembly first surface at first and second arcuate reflective land surfaces 158 and 160, respectively, and are separated from each other by a third arcuate reflective land surface 162, which also intersects with the first surface of the light guide assembly body. Land surface 162 minimizes so called "hot spots" or areas wherein light is perceived to be brighter in the glow ring than in other areas of the glow ring.

Figure 7A:
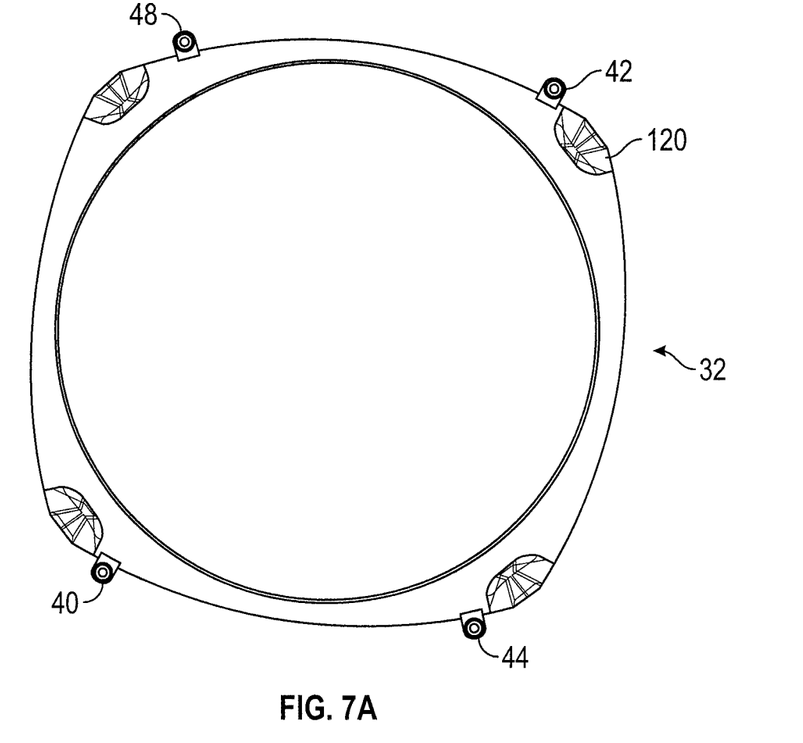
FIG. 7A is a schematic top plan view of the light guide assembly showing the prismatic Y shaped reflective structures and locator tabs.
Figure 7B:
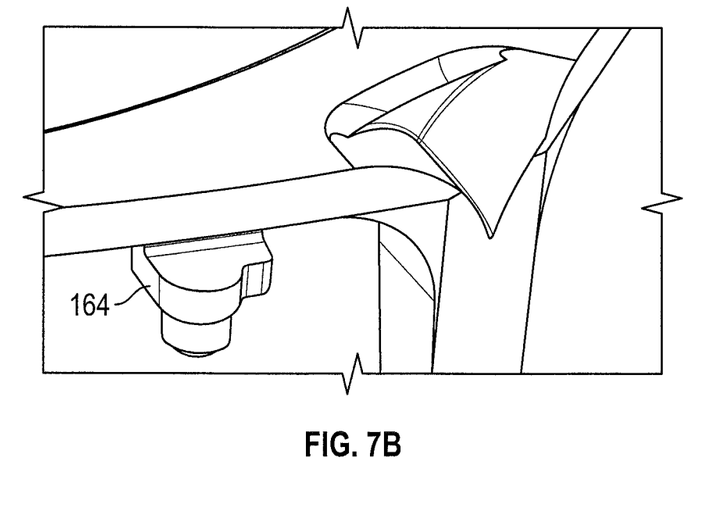
FIG. 7B is a detail of the light guide assemble taken a A in FIG. 7B showing the position of the locator tabs.

FIGS. 7A and 7B shows another embodiment of the light guide assembly 32. FIG. 7A shows the light guide assembly from a top plan perspective showing the prismatic Y shaped reflective structure as well as the locator tabs 42, 44, 46 and 48 in close proximity to the prismatic Y shaped reflective structure 120. The light guide assembly is formed of a transparent, moldable elastomeric material having a predetermined index of refraction. The light guide assembly is made in a one shot mold process to minimize costs, and ensure that the prismatic reflective structure is formed at each intersection of the legs with the body of the light guide assembly along, at or near the first surface of the assembly.

The locator tabs have traditionally been associated with "light bleed", wherein light is channel to the locators, leaks from the substrate, and is thereby lost to the glow ring. As shown in FIG. 7B, it has been determined that positioning the locator tabs in a plane 164 below the plane of the glow ring virtually eliminates the light bleed phenomenon. By positioning the locator tabs thus, light transmission through the glow ring substrate is substantially uniform, thereby essentially eliminating hot spots or dark spots.

Figure 8:
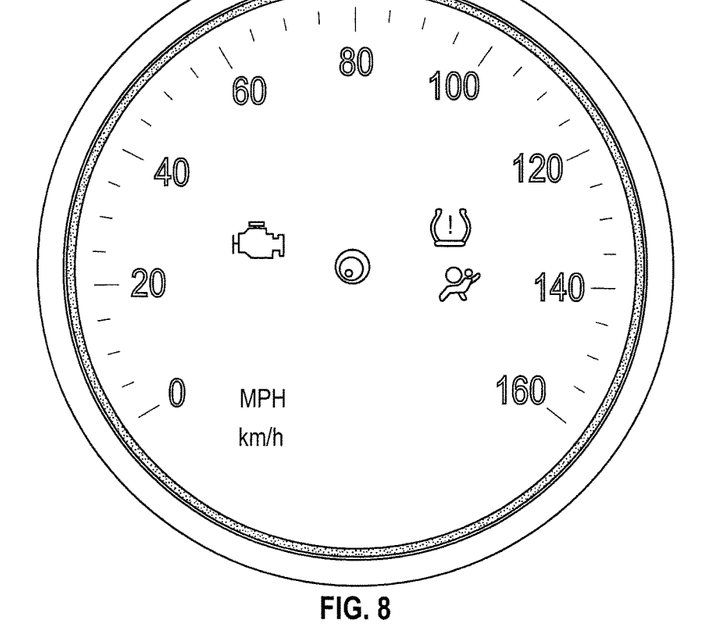
FIG. 8 is a schematic representation of a portion of an instrument panel showing the substantially uniform illumination of the gauge when using a prismatic light emitting assembly according to the present disclosure.

FIG. 8 is a detailed view of the glow ring in place in an instrument panel showing the substantially uniform illumination of the glow ring. Such uniform illumination is more aesthetically pleasing, and presents a very clear outline of the gauge and what is happening on the gauge.

Figure 9:
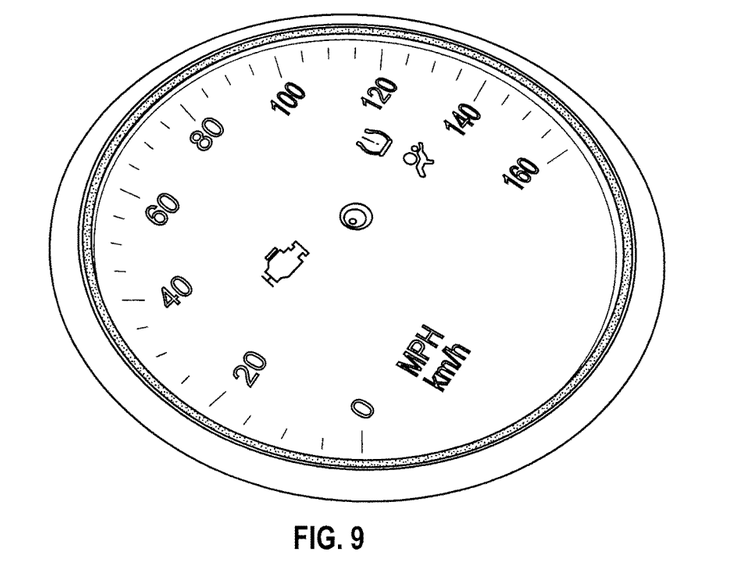
FIG. 9 is a perspective side view of the illuminated glow ring showing substantially uniform lighting with substantially no bright spots.

FIG. 9 is a perspective side view of the illuminating glow ring in an instrument panel setting. As seen therein, there is substantially uniform lighting with substantially no bright spots or dark spots.

The light emitting guide assembly is shown in this description as illuminating a vehicle instrument panel. However, it is apparent that the light guide assembly may also find application in vanity lights, vanity mirrors, interior lighting, lighting controls, switches, door lights, reading lights, accent lights, steering wheels, radios/infotainment system lighting, etc.

While several embodiments have been shown, it is clear that the many variations and modifications may be made by those skilled in the art, and the words used are words of description, and not words of limitation.

What is claimed as new and desired to be protected by Letters Patent of the United States is:

1. A light emitting assembly for instrument panel illumination, comprising:
   a light guide assembly having opposed first and second surfaces separated by a sidewall extending substantially unbroken therebetween to define a light guide assembly body with a light guide body index of refraction;
   at least one light transmissive leg extending from said second surface of said light guide assembly body, said light transmissive leg having a first end and a second end separated by a length to define a leg body; said first end having a light input surface along an edge of said leg;
   at least one light emitting diode in close proximity to said light input surface; said light emitting diode emitting an incident light ray at an angle of incidence to said light input surface;
   said leg having in index of refraction for refracting said incident light ray to a refractive light ray along said light transmissive leg; said second end of said leg integral with said light guide assembly body at an intersection and extending therefrom; said intersection of said second end of said leg and said light guide assembly body forming a Y shaped light reflective structure at said first surface of said body;
   the Y shaped light reflective structure comprising first and second intersecting concave arcuate surfaces and a top surface intersecting with the first and second concave arcuate surfaces along upwardly inclined arcuate land surfaces; and
   said Y shaped light reflective structure forming an angle of reflection surface at said intersection with said first surface of said body of a predetermined angle of reflection to reflect said refractive light ray from said leg to said second surface of said light guide assembly body; said reflected light ray being refracted substantially uniformly through said light guide assembly body along said first and second body surfaces to produce substantially uniform illumination of said light guide assembly.

2. The light guide emitting assembly of claim 1, further including a transparent substrate overlying said light emitting assembly.

3. The light guide emitting assembly of claim 1, wherein said predetermined angle of reflection at said intersection of said Y shaped light reflective structure and said body is between about 6 degrees to about 10 degrees along said first surface of said light guide assembly body.

4. A light emitting assembly for instrument panel illumination, comprising:
   a light guide assembly having opposed first and second surfaces separated by a sidewall extending substantially unbroken therebetween to define a light guide assembly body with a light guide body index of refraction;
   at least one light transmissive leg extending from said second surface of said light guide assembly body, said light transmissive leg having a first end and a second end separated by a length to define a leg body; said first end having a light input surface along an edge of said leg;
   at least one light emitting diode in close proximity to said light input surface; said light emitting diode emitting an incident light ray at an angle of incidence to said light input surface;
   said leg having in index of refraction for refracting said incident light ray to a refractive light ray along said light transmissive leg; said second end of said leg integral with said light guide assembly body at an intersection and extending therefrom; said intersection of said second end of said leg and said light guide assembly body forming a Y shaped light reflective structure at said first surface of said body;
   said Y shaped light reflective structure forming an angle of reflection surface at said intersection with said first surface of said body of a predetermined angle of reflection to reflect said refractive light ray from said leg to said second surface of said light guide assembly body; said reflected light ray being refracted substantially uniformly through said light guide assembly body along said first and second body surfaces to produce substantially uniform illumination of said light guide assembly, wherein said prismatic Y shaped light reflective structure includes first and second concave arcuate surfaces opposed to each other by an angle and intersecting with each other at first end and intersecting said light guide emitting assembly body at a second end; said Y shaped reflective structure having a top surface intersecting said concave arcuate surfaces by first and second upwardly inclined arcuate land surfaces; said top surface concavely arcuate and intersecting said light guide emitting assembly first surface at first and second arcuate reflective land surfaces separated by a third arcuate reflective land surface.

5. The light emitting assembly of claim 1, wherein said light emitting diode is connected to an electrical circuit.

6. The light emitting assembly of claim 1, wherein said light guide assembly is equipped with up to four legs.

7. The light emitting assembly of claim 1, further including locator structures at predetermined spaces substantially along an outer periphery of said light guide assembly body.

8. The light emitting assembly of claim 1, further including a predetermined inner periphery.

9. The light emitting assembly of claim 1, wherein said light emitting diode is proximal said light input surface.

10. An illuminated vehicle instrument panel, comprising:

a visor having a body with at least one aperture therethrough for viewing a gauge;

a light guide assembly having opposed first and second surfaces separated by a sidewall extending substantially unbroken therebetween to define a light guide assembly body with a light guide body index of refraction;

at least one light transmissive leg extending from said second surface of said light guide assembly body, said light transmissive leg having a first end and a second end separated by a length to define a leg body; said first end having a light input surface along an edge of said leg;

said leg having in index of refraction for refracting said incident light ray to a refractive light ray along said light transmissive leg; said second end of said leg integral with said light guide assembly body at an intersection and extending therefrom; said intersection of said second end of said leg and said light guide assembly body forming a Y shaped light reflective structure at said first surface of said body;

said Y shaped light reflective structure forming an angle of reflection surface at said intersection with said first surface of said body of a predetermined angle of reflection to reflect said refractive light ray from said leg to said second surface of said light guide assembly body; said reflected light ray being refracted substantially uniformly through said light guide assembly body along said first and second body surfaces to produce substantially uniform illumination of said light guide assembly;

an appliqué with at least one detent therein to accept said gauge; said appliqué further equipped with at least one locator aperture to accommodate said light transmissive leg;

a light housing with at least one aperture therethrough; at least one of said apertures to accommodate said light transmissive leg;

a circuit with at least one light emitting diode; said light emitting diode in close proximity to said light input surface when said instrument panel is assembled; said light emitting diode emitting an incident light ray at an angle of incidence to said light input surface; and a transparent substrate overlying at least said visor body aperture for viewing said gauge, wherein said Y shaped light reflective structure includes first and second concave arcuate surfaces opposed to each other by an angle and intersecting with each other at first end and intersecting said light guide emitting assembly body at a second end; said Y shaped reflective structure having a top surface intersecting said concave arcuate surfaces by first and second upwardly inclined arcuate land surfaces; said top surface concavely arcuate and intersecting said light guide emitting assembly first surface at first and second arcuate reflective land surfaces separated by a third arcuate reflective land surface.

11. The vehicle instrument panel of claim 10, wherein said light emitting diode is proximal said light input surface.

12. The vehicle instrument panel of claim 10, wherein said transparent substrate is at least one of a sheet, a lens, a film or a plate.

13. The vehicle instrument panel of claim 10, wherein said predetermined angle of reflection at said intersection of said Y shaped light reflective structure and said body is between about 6 degrees to about 10 degrees along said first surface of said light guide assembly body.

* * * * *

UNITED STATES PATENT AND TRADEMARK OFFICE
CERTIFICATE OF CORRECTION

PATENT NO. : 9,889,793 B2
APPLICATION NO. : 14/990263
DATED : February 13, 2018
INVENTOR(S) : Arul Krishna et al.

Page 1 of 1

It is certified that error appears in the above-identified patent and that said Letters Patent is hereby corrected as shown below:

In the Claims

Column 6, Line 45 (Claim 4) "prismatic" should be deleted

Signed and Sealed this
First Day of May, 2018

Andrei Iancu
*Director of the United States Patent and Trademark Office*